UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

MANUFACTURE OF GLYCOLS.

1,259,757.  Specification of Letters Patent.  Patented Mar. 19, 1918.

No Drawing. Original application filed March 29, 1913, Serial No. 757,582. Divided and this application filed January 25, 1917. Serial No. 144,524.

*To all whom it may concern:*

Be it known that I, KARL P. McELROY, a citizen of the United States, residing at Washington, in the District of Columbia, have invented certain new and useful Improvements in the Manufacture of Glycols, of which the following is a specification.

This invention relates to the manufacture of glycols; and it comprises a process wherein the mixed chlorids obtained by chlorinating oil gas are heated under pressure with a liquid comprising water and a carbonate, such as calcium carbonate; and it also comprises as a new composition a mixture of glycols corresponding to the mixture of olefins in oil gas; all as more fully hereinafter set forth and as claimed.

The glycols and the various glycol derivatives such as the acetates, are bodies possessed of properties adapted to make them useful in the arts, but no cheap and efficient method of producing them is in use. It is comparatively easy to produce dihalids by direct reaction of bromin or chlorin on the double bond hydrocarbons or olefins; and these dihalids possess in some respects the properties of esters of glycols. But saponification of these dihalids in quite difficult and it is still more difficult to obtain good yields of the saponified products, the glycols. This is for a variety of reasons, one being that the reaction of the dihalids with alkali hydroxid in lieu of being, as might be expected, a direct substitution of hydroxyl for halogen is apt to take another course and result in the withdrawal of hydrogen and one atom of halogen with formation of an unsaturated compound. Ethylene, for example, easily unites directly with bromin or chlorin to form a dihalid, but this dihalid on treatment with KOH or NaOH gives the corresponding vinyl derivatives in greater or less proportion. Potassium carbonate works better than the hydroxids but must be used in dilute solution and the yield for this reason (glycol being quite volatile with water vapors) and because of the formation of some amount of vinyl compounds, is always very poor. A further inconvenience in the potassium carbonate method arises from the fact that potassium chlorid or bromid crystallizes out of the mother liquors on concentration of the resulting glycol solutions and makes the material inconvenient to handle.

For the stated reasons, in the laboratory production of glycols (these bodies are not made commercially) it is usual to employ an indirect method of production, that of first making an acetate from the dihalid (usually the bromid) with an alcoholic solution of potassium acetate and then saponifying this acetate to make a glycol.

I have discovered that a cheaper, better and more productive treatment of these dihalids to obtain useful products is to employ calcium salts of weak acids in the presence of a limited amount of water and at a rather high temperature. By so doing I secure a number of simultaneous advantages. Lime is not as strong as soda or potash and does not have the same tendency to form unsaturated compounds; nor do its salts dissociate in solution to form free alkali to the same extent. The dissociation of potassium carbonate solution in the usual direct method is presumed to be responsible for the formation of vinyl compounds. On treating an olefin bromid or chlorid with a lime salt one product of the reaction is of course the corresponding calcium halid; and both the chlorid and the bromid of calcium are readily soluble, hygroscopic salts forming solutions with water which retain their fluidity even at relatively high temperatures. There is not therefore the necessity, as with potassium and sodium salts, of removing crops of crystals from time to time. Permanently fluid reaction mixtures, from which glycols or their esters may be easily recovered, may be made without the use of undue amounts of water.

By operating under pressure at temperatures of, say, 100° C. to 150° C. in a closed container the usual difficulty of slowness of reaction disappears and furthermore it is not necessary to employ a solvent of olefin halid, such as alcohol, to keep such halid in the sphere of reaction. Alcohol may be used in the present invention and is useful; but it may also be dispensed with.

While either a dibromid or a dichlorid may be used in the present invention, in practice I prefer the dichlorids both because of the less bulk and because calcium chlorid is a better component of the final reaction mixture than is calcium bromid.

I regard the present process as particularly applicable to the mixed olefin chlorids made by chlorinating oil gas from petroleum oils. By exposing vapors of heavy crude petroleum, or of heavy still residua, such as fuel oils, to a temperature around 700° C. for a brief time they may be cracked down into gases carrying 40 to 70 per cent. total olefins, mainly ethylene and propylene. Such a gas after freeing of condensable bodies, on direct treatment with chlorin yields a mixture of dichlorids which may be treated by the present process to yield mixtures of glycols or glycol derivatives which are of advantageous properties. Of course the dichlorids may be fractionated into ethylene, propylene, etc., dichlorids, and these then separately treated; but the usual mixture of olefins of such oil gas gives a mixture of chlorids which in turn give glycol mixtures of advantageous properties.

In one specific embodiment of my invention, I may take such a mixture of chlorids formed from a petroleum gas and place it in any suitable container capable of withstanding heat and pressure. To the chlorids I may add about an equal amount of fine powdered calcium carbonate and at least enough water to make a pulpy mass. The container is now closed and an agitator set in motion. Agitation should be active. The mixture is now heated up to, say, 115° to 130° C. for a period of, say, two or three hours, or longer. As the reaction produces $CO_2$ some gas may be vented off from time to time, the venting being best through a reflux condenser and past an ordinary condenser to prevent escape of as much volatiles as possible from the container and to recover those vapors which are vented off with the gas. As these chlorids are quite volatile, some are apt to escape in this venting off, going past the reflux. It is advantageous to keep as much $CO_2$ pressure in the container as is convenient, in addition to the steam pressure corresponding to the heat, as this facilitates and quickens the reaction as well as obviating any tendency toward the vinyl producing reaction alluded to. The $CO_2$ makes the carbonate more soluble in water and thereby quickens the action.

As the reaction in the container goes forward, the calcium carbonate is gradually converted into calcium chlorid which forms a heavy solution with the water present and the glycol formed, and in this heavy solution emulsification and efficient contact of the oily chlorids is comparatively easy. The container being closed, there is no loss of either chlorids or of glycol except in venting off, and this little may be recovered in the stated manner.

At the end of the reaction, with the quantities indicated, the oily chlorids and the calcium carbonate will have disappeared and there will remain a solution of calcium chlorid and the glycol formed. Only a limited amount of water having been used, there is usually no necessity of concentrating this liquor prior to recovering the glycol. It may be simply steamed out and the glycol blown over in a manner analogous to the recovery of glycerin. The distillate may be treated in the same manner as a glycerin distillate for concentration, it being borne in mind however that glycol is considerably more volatile with water vapor than is glycerin. The mixed glycols from oil gas olefins suffer less loss than pure ethylene glycol solutions. The calcium chlorid solution is particularly well adapted for the steaming operation. In lieu of steaming, of course vacuum distillation may be used; or currents of hydrogen, blue water gas, or other indifferent gas may be employed. But the steaming is simple and effective.

Any form of calcium carbonate, such as air slaked lime, ground chalk, precipitated carbonate of lime, etc., may be employed; but I find the precipitated carbonate the most reactive.

As the calcium chlorid exerts a facilitating action upon the glycol forming reaction, in making up a charge it is often desirable to use some of the mother liquor from a prior operation in lieu of part of the water. In concentrating the distillate after steaming, the water vapors volatilizing may advantageously be condensed and the condensate used in forming steam for steaming out or in lieu of water in making up a charge as this enables saving such glycol as may have volatilized therewith.

An advantageous method of operation is to concentrate the condensate from the steaming operation in a closed container, thereby obtaining a concentrated glycol, and to use the vapors from the concentrating apparatus in lieu of steam for steaming out a fresh finished charge.

In the stated operation using the dihalids from oil gas there results a mixture of ethylene and propylene glycols with some butylene glycols; a mixture which is desirable for use as such since for many purposes its properties are better than those of pure ethylene glycol. If the oily chlorids from the oil gas have been fractionated to recover pure ethylene dichlorid and propylene dichlorid separately, and the separate fractions then treated in the manner described, then the products will naturally be the pure glycols. If pure glycols are desired it is better to fractionate the halids than to try to separate the glycols after formation.

If the olefin bromids are used in lieu of the chlorids, the temperature may be somewhat lower and the time of operation shorter, and the relative proportions must be changed. Using the mixed bromids from oil gas, a good proportion is one part calcium carbonate, two parts of mixed bromids and six to eight, or more, parts of water.

While strontium and barium salts may be used, they are not as desirable in the present invention as the calcium compounds for the reason that the barium and strontium chlorids and bromids do not have the desired physical relations to water of the corresponding calcium salts. On the other hand, salts of the remaining alkaline earth, magnesia may well be used since magnesium chlorid and bromid have the same desirable properties in this respect as the calcium salts. Dolomitic limestone may be used in preparing the carbonate used.

Zinc carbonate or oxycarbonate may be used as substitute for calcium carbonate as it also gives hygroscopic halid salts. Zinc chlorid however in concentrated solutions is a strong dehydrating agent and without care in operation, may damage the glycols, etc.

Addition of a little sodium sulfate to the reaction mixture quickens the reaction but has some incidental disadvantages.

The reaction mixtures described are all neutral and non-corrosive and the operations can be readily performed in iron, steel, or copper vessels.

At temperatures around 200° C. the reaction is much quicker, but with these high temperatures the amount of water present should be considerably increased and a more dilute glycol solution is obtained.

This case is a division of my prior application Serial No. 757,582, filed March 29, 1913 wherein I claim broadly the use of salts of weak acids, and more specifically the use of acetates for treating the mixed chlorids from oil gas.

What I claim is:—

1. The process of producing glycols which comprises chlorinating oil gas, which has been subjected to a temperature around 700° and which contains a large percentage of unsaturated hydrocarbons, including ethylene and propylene, to obtain dichlorids and then saponifying the latter by heating under pressure to a reacting temperature with water and a salt of carbonic acid.

2. The process of producing glycols which comprises halogenating oil gas, which has been subjected to a temperature around 700° and which contains a large percentage of unsaturated hydrocarbons, including ethylene and propylene, to obtain dihalids and then saponifying the latter by heating under pressure to a reacting temperature with water and a salt of carbonic acid.

3. The process of producing glycols which comprises chlorinating oil gas, which has been subjected to a temperature around 700° and which contains a large percentage of unsaturated hydrocarbons, including ethylene and propylene, to obtain dichlorids and then saponifying the latter by heating under pressure to a reacting temperature with water and calcium carbonate.

4. The process of producing glycols which comprises halogenating oil gas, which has been subjected to a temperature around 700° and which contains a large percentage of unsaturated hydrocarbons to produce dihalids and then saponifying the latter by heating under pressure to a reacting temperature with water and calcium carbonate.

5. The process of producing a glycol mixture, which comprises subjecting oil to a high and gasifying temperature, treating the resulting gaseous mixture with chlorin to convert the unsaturated derivatives into the corresponding chlorin compounds, and saponifying said chlorin compounds by heating the mixture in the presence of aqueous carbonate solution, under pressure, and thereby producing a mixture consisting essentially of ethylene, propylene and butylene glycols.

6. The process of producing a glycol mixture, which comprises chlorinating a mixture of unsaturated hydrocarbons of the ethylene series consisting essentially of ethylene, propylene and butylene, and saponifying the chlorin compounds thus obtained by treatment with a saponifying agent, thereby producing a mixture consisting essentially of ethylene, propylene and butylene glycols.

7. The method of producing a glycol mixture, which comprises cracking oil to produce gas and thereby producing a mixture of unsaturated ethylene derivatives and of saturated hydrocarbons; chlorinating the unsaturated hydrocarbons of the ethylene series and thereby producing mixtures of the corresponding dichlorids and saponifying the dichlorids with a suitable saponifying agent and thereby producing a mixture of glycols.

8. As a new composition of matter a concentrated solution of glycols containing the glycols corresponding to the olefins of oil gas from petroleum cracked at a temperature around 700° C.

9. A liquid composition comprising an intimate mixture of ethylene, propylene and butylene glycols.

In testimony whereof, I affix my signature.

K. P. McELROY.